Oct. 21, 1952  H. T. EVANS, JR  2,615,136
X-RAY SINGLE CRYSTAL GONIOMETER
Filed Aug. 3, 1950
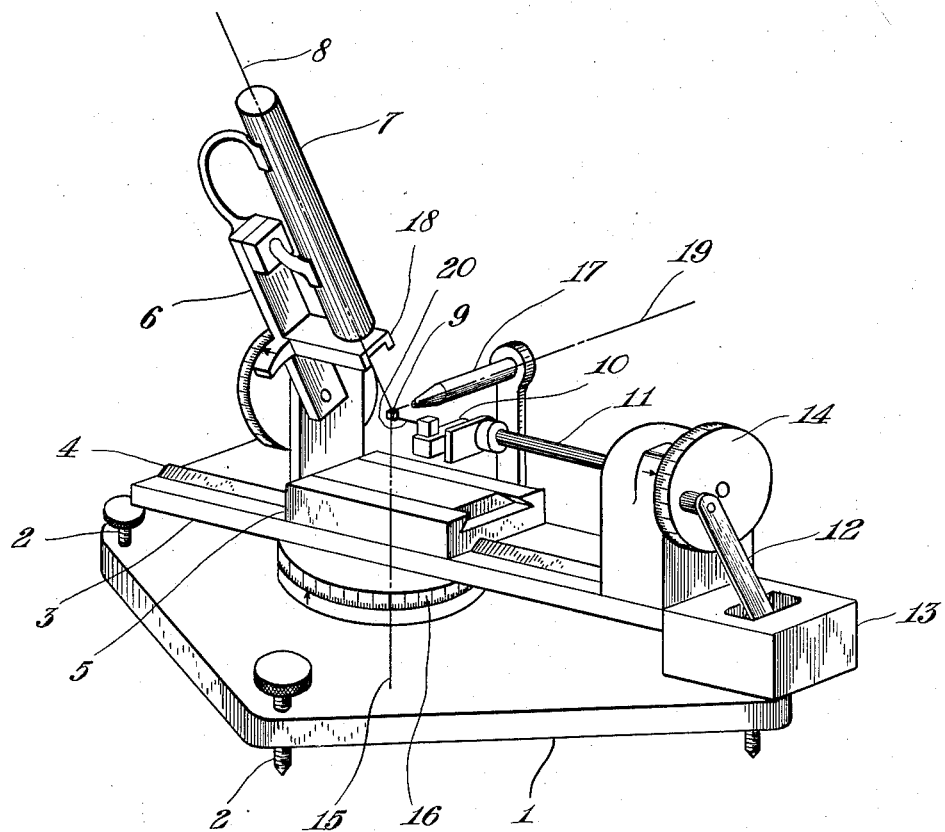
HOWARD T. EVANS, JR.
INVENTOR.
BY Fred M Vogel
AGENT.

Patented Oct. 21, 1952

2,615,136

UNITED STATES PATENT OFFICE 2,615,136

X-RAY SINGLE CRYSTAL GONIOMETER

Howard T. Evans, Jr., White Plains, N. Y., assignor to Philips Laboratories, Inc., Irvington-on-Hudson, N. Y.

Application August 3, 1950, Serial No. 177,500

6 Claims. (Cl. 250—52)

My invention relates to an X-ray single crystal goniometer which is adapted to resolve all of the diffraction effects of a single crystal.

Accuracy of results in analyzing crystal structure data is being emphasized to an ever greater degree in accurately determining the structure of a given crystalline specimen. Accuracy of results in turn depends upon the accuracy of measurements made with available instruments and since available instruments are incapable of sufficient refinement to achieve desired accuracy, it has become necessary to devise new instruments.

Accordingly, it is an object of my invention to provide a new goniometer construction for single crystal diffraction study which is capable of improved accuracy.

It is another object of my invention to provide a modification of an existing single crystal goniometer which is capable of measuring the intensity of diffracted radiation with greater precision.

These and further objects of my invention will appear as the specification progresses.

Heretofore, in single crystal diffraction study, it has been conventional to employ a film mounted in a holder and movable with respect to the crystal as the crystal is rotated for recording diffraction beams from the crystal in order to obtain a series of patterns which unequivocally identified the crystal lattice. Thus, as the crystal is rotated, the film holder, which is mounted on a movable carriage, is moved past the crystal so that a series of patterns is recorded upon the film which corresponds to the various positions of the crystal. However, since films have been developed to a point where increased sensitivity cannot be expected, weak diffraction beams often are not recorded on the film and much valuable data is lost. Moreover, the blackening of the film is not directly proportional to the intensity of radiation due to various factors.

In accordance with the present invention, I employ a Geiger-Müller tube for making intensity measurements of the diffracted beam in connection with a single crystal goniometer. Since the Geiger-Müller tube has a very much greater sensitivity than films sensitive to X-radiation, it is possible to measure the intensities of much weaker beams and to measure relative intensities of diffracted beams more precisely and thereby enlarge the quantity of data available from the X-ray examination of a single crystal.

In the preferred embodiment of the invention, the crystal is attached to a spindle for rotation by means of a universal adjustment member about the spindle axis. A collimator for providing a parallel beam of X-radiation is directed at the crystal, the axis of the collimator being perpendicular to a tilt axis about which the crystal may be tilted. The Geiger-Müller tube is supported on a rotatable mounting bracket which is movable on a track perpendicular to the tilt axis and when the tilt is zero, is perpendicular to the collimator axis. Various slits and apertures are provided between the window of the Geiger-Müller tube and the crystal to permit the diffracted beam or a part thereof to pass into the tube. Means are also provided to rock the crystal through an angle required to generate the whole diffracted beam.

In making intensity measurements of the diffracted beam, three angles are required to set the apparatus for any particular diffraction beam: the angular position of the crystal; the angular position of the Geiger-Müller tube; and the tilt angle. These angles may be measured directly from film records made with a film holder in place of the Geiger-Müller tube.

The Geiger-Müller tube is aligned by moving its carriage until the axis of the tube intersects the collimator and spindle axes after which the apparatus is locked in this position. The three angular settings are then fixed for a particular diffraction beam to be measured and refined by noting the response of the Geiger-Müller tube and the Geiger-Müller tube locked in position. The crystal is then rocked through an angle large enough so that the whole profile of the diffracted beam is received by the Geiger-Müller tube. This procedure is systematically repeated for all reflections within the range of the apparatus.

The invention will be described in greater detail in connection with the accompanying drawing in which the sole figure shows an X-ray single crystal goniometer according to the invention.

Referring to the drawing, the goniometer comprises a base 1 which is adapted to be levelled by adjustable levelling screws 2 and supports a platform 3 provided with a track 4 for guiding a carriage 5 supporting a Geiger-Müller tube mounting bracket 6. A Geiger-Müller tube 7 is rotatably supported on the mounting bracket and is arranged to rotate with the bracket so that its sensitive axis 8 always passes through the crystal 9 in a manner to be set forth hereinbelow.

The crystal is mounted on a glass fiber 20 secured to a universal orienting head 10 mounted on a spindle 11 which is rocked by a crank 12 driven by an oscillating mechanism housed in an enclosure 13. The angle at which the crystal is rocked is measured on circular scale 14.

The platform is rotatable or tiltable about an axis 15 and the angle of tilt relative to axis of the X-ray beam can be measured on circular scale 16.

A collimator 17 provides a parallel beam of X-radiation which is directed at the crystal. The collimator is secured to the base of the instrument and remains in fixed position relative to the crystal. In order to limit the beam entering the Geiger-Müller tube, a slit system 18 is provided between the window of the tube and the crystal. The axis of the collimator must always intersect the tilt axis and the sensitive axis of the Geiger-Müller tube.

A further feature of the invention is that the Geiger-Müller tube carriage can be moved out of position by sliding it along the track and can be replaced by a film holder for making film records of the diffracted beam.

In order to make measurements of the diffracted beam from the crystal, the Geiger-Müller tube is replaced by a film holder by moving the carriage to the left along the track. A film holder is then positioned for making a photographic record of X-radiation diffracted by the crystal. From the photographic record thus obtained, the angular settings at which the crystal diffracts radiation can be determined. The Geiger-Müller tube is then aligned with the crystal by moving the carriage along the track until the sensitive axis of the tube intersects the collimator and spindle axis and is locked in this position. The three angular settings, i. e. the angle of inclination of the Geiger-Müller tube, the angle of tilt, and the angle of rotation of the crystal, are then approximately fixed from the angular measurements derived from the film for one beam reflected from the crystal. These angular adjustments are further refined by noting the response of the Geiger-Müller tube and the angular settings adjusted for maximum response. At this position, the Geiger-Müller tube is locked in position and the crystal then rocked through an angle large enough to develop the whole profile of the diffracted beam, i. e. the crystal is rocked generally through an angle of about one degree, which permits the Geiger-Müller tube to detect the shape of the diffracted beam. This procedure is then systematically repeated for all angular settings at which reflections occur and which are within the range of the apparatus.

The output of the Geiger-Müller tube may be recorded with conventional recording equipment and intensity measurements made of the diffracted beam.

While I have thus described my invention in a specific embodiment and with specific applications thereof, other modifications and applications thereof will be readily apparent to those skilled in the art without departing from the spirit and scope of the invention as defined in the appended claims.

What I claim is:

1. A single crystal X-ray goniometer comprising a base, a rotatable carriage support having a given axis of rotation, a carriage movable in a given direction along said support, a rotatable mounting bracket supported by said carriage, a Geiger-Müller tube supported by said mounting bracket and rotatable about an axis perpendicular to said given axis, a rotatable spindle adapted to support a crystalline specimen, and collimating means for directing a parallel beam of X-radiation at said specimen, said Geiger-Müller tube and said specimen being so arranged that the sensitive axis of the Geiger-Müller tube, the axis of the beam of radiation and the axis of rotation of said carriage support intersect in said specimen.

2. A single crystal X-ray goniometer comprising a base, a carriage support provided with a track guide thereon and rotatable about a given axis, a carriage movable along said track guide, a rotatable mounting bracket supported by said carriage, a Geiger-Müller tube supported by said mounting bracket and rotatable about an axis perpendicular to said given axis, a rotatable spindle adapted to support a crystalline specimen, and collimating means for directing a parallel beam of X-radiation at said specimen, said collimating means having a given axis perpendicular to the axis of rotation of the support, said Geiger-Müller tube and said specimen being so arranged that the sensitive axis of the Geiger-Müller tube, the axis of the beam of radiation and the axis of rotation of said carriage support intersect in said specimen.

3. A single crystal X-ray goniometer comprising a base, a carriage support provided with a track guide thereon rotatable about a given axis, a carriage movable along said track guide, a mounting bracket movably supported by said carriage, said mounting bracket being rotatable about an axis perpendicular to said given axis, a Geiger-Müller tube supported by said mounting bracket, a rotatable spindle adapted to support a crystalline specimen, means to rock the spindle supporting the specimen through a given angle, and collimating means for directing a parallel beam of X-radiation at said specimen, said collimating means having a given axis perpendicular to the axis of rotation of the support, said Geiger-Müller tube and said specimen being so arranged that the sensitive axis of the Geiger-Müller tube, the axis of the beam of radiation and the axis of rotation of said carriage support intersect in said specimen.

4. A single crystal X-ray goniometer comprising a base, a carriage support provided with a track guide thereon rotatable about a given axis, a carriage movable along said track guide, a mounting bracket movably supported by said carriage, said mounting bracket being rotatable about an axis perpendicular to said given axis, a Geiger-Müller tube supported by said mounting bracket, a rotatable spindle adapted to support a crystalline specimen, means to rock the spindle supporting the specimen through a given angle, collimating means for directing a parallel beam of X-radiation at said specimen, said collimating means having a given axis perpendicular to the axis of rotation of the support, said Geiger-Müller tube and said specimen being so arranged that the sensitive axis of the Geiger-Müller tube, the axis of the collimating means and the axis of rotation of said carriage support intersect in said specimen, and means to measure the angle between the sensitive axis of the Geiger-Müller tube and the axis of the collimating means.

5. A single crystal X-ray goniometer comprising a base, a carriage support having a given longitudinal axis and being provided with a track guide thereon, said carriage support being rotatable about an axis perpendicular to said given axis, a carriage movable along said track guide, a mounting bracket movably supported by said carriage, said mounting bracket being rotatable about an axis perpendicular to the axis of the carriage support, a Geiger-Müller tube supported by said mounting bracket, a rotatable spindle adapted to support a crystalline specimen, means to rock the spindle supporting the specimen through a given angle, collimating means for directing a parallel beam of X-radiation at said specimen, said collimating means having a given axis perpendicular to the axis of rotation of the support, said Geiger-Müller tube and said specimen being so arranged that the sensitive axis of the Geiger-Müller tube, the axis of the collimating means and the axis of rotation of said carriage support intersect in said specimen, means to measure the angle between the sensitive axis of the Geiger-Müller tube and the axis of the collimating means, and means to measure the angle between said given axis of said carriage support and said collimator axis.

6. A single crystal X-ray goniometer comprising a base, a carriage support having a given longitudinal axis and being provided with a track guide thereon, said carriage support being rotatable about an axis perpendicular to said given axis, a carriage movable along said track guide, a mounting bracket movably supported by said carriage, said mounting bracket being rotatable about an axis perpendicular to the axis of the carriage support, a Geiger-Müller tube supported by said mounting bracket, said Geiger-Müller tube having a given sensitive axis forming an angle with the axis of rotation of the carriage support, a rotatable spindle adapted to support a crystalline specimen, means to rock the spindle supporting the specimen through a given angle and collimating means for directing a parallel beam of X-radiation at said specimen, said collimating means having a given axis perpendicular to the axis of rotation of the support, said Geiger-Müller tube and said specimen being so arranged that the sensitive axis of the Geiger-Müller tube, the axis of the collimating means and the axis of rotation of said carriage support intersect in said specimen, means to measure the angle between the said sensitive axis of the Geiger-Müller tube and the collimator axis, means to measure the angle between said given axis of the carriage support and said collimator axis, and means to measure the angular rotation of said specimen when rocked.

HOWARD T. EVANS, Jr.

REFERENCES CITED

The following references are of record in the file of this patent:

UNITED STATES PATENTS

| Number | Name | Date |
|---|---|---|
| 1,589,833 | Behnken et al. | June 22, 1926 |
| 2,377,862 | Bond | June 12, 1945 |
| 2,380,235 | Harker | July 10, 1945 |

OTHER REFERENCES

GE X-Ray Corp Publication, 7A-560, June 15, 1939, pgs. 8 and 16.